(No Model.) 2 Sheets—Sheet 2.
F. J. WOOD.
POTATO DIGGER.
No. 537,953. Patented Apr. 23, 1895.
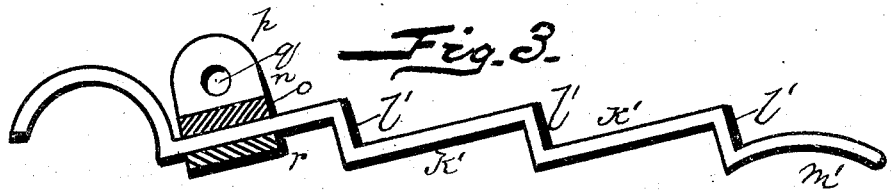
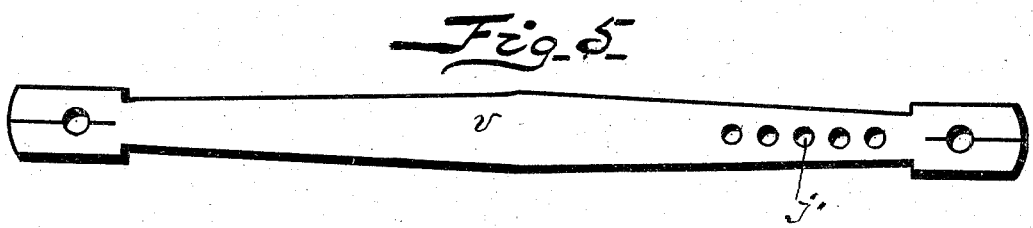
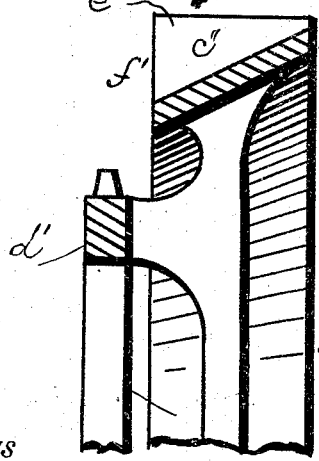
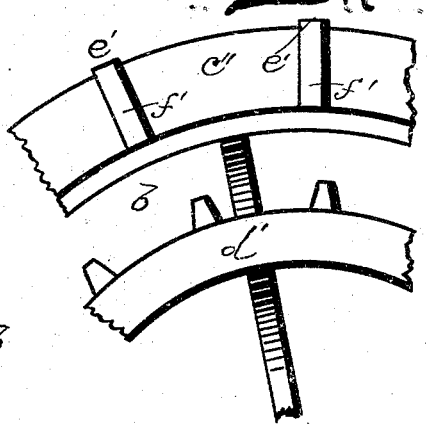
WITNESSES
Jas. B. Clarke
M. M. Morris
INVENTOR.
F. J. Wood
by E. H. Bates Attorney.
THE NORRIS PETERS CO., PHOTO-LITHO., WASHINGTON, D. C.

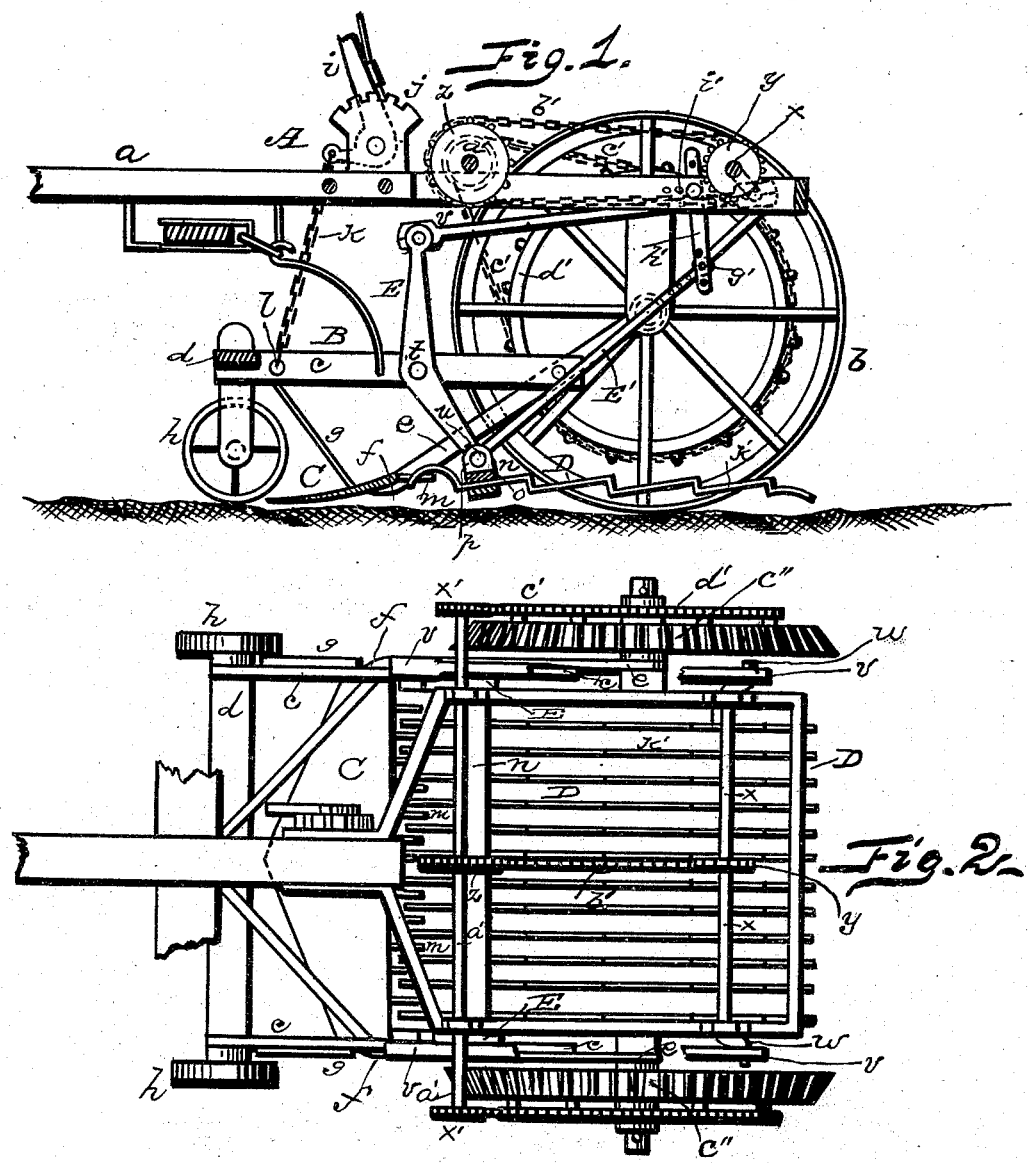

UNITED STATES PATENT OFFICE.

FRANCIS J. WOOD, OF GREENVILLE, MICHIGAN.

POTATO-DIGGER.

SPECIFICATION forming part of Letters Patent No. 537,953, dated April 23, 1895.

Application filed December 18, 1894. Serial No. 532,182. (No model.)

*To all whom it may concern:*

Be it known that I, FRANCIS J. WOOD, a citizen of the United States, residing at Greenville, in the county of Montcalm and State of Michigan, have invented certain new and useful Improvements in Potato-Diggers; and I do hereby declare the following to be a full, clear, and exact description of the invention, such as will enable others skilled in the art to which it appertains to make and use the same.

This invention has relation to improvements in potato diggers and it consists in the novel construction, combination and arrangement of parts of which it is composed all as will be hereinafter more fully explained.

The annexed drawings, to which reference is made, fully illustrate my invention, in which—

Figure 1 represents a vertical sectional view of my device. Fig. 2 is a plan view of the same. Fig. 3 is a vertical sectional view of the grate, detached from the machine. Fig. 4 is a detail view of the grate bar, partly in section. Fig. 5 is a side view of one of the pitmen. Fig. 6 is a detail cross sectional view of one of the transporting wheels; and Fig. 7 is a face view of the same.

Referring by letter to the accompanying drawings, A designates the main frame of the machine, having the tongue $a$ and transporting wheels $b$ upon which said frame is mounted.

B, represents a frame, arranged below the main frame and consists of the two parallel side bars $c$ connected at their forward ends by a cross bar $d$ and the rear ends of these bars are bolted to inclined side bars $e$, which latter in turn are connected to the axle of the main frame, while the forward ends of said inclined bars are bolted to either side of the shovel as at $f$. A brace bar $g$ connects the inclined bars to the side bars $c$ whereby the one is made rigid with the other and permitting, at the same time, said lower frame to have adjustment by being pivoted at its rear to said axles. The forward end of this lower frame is provided with caster wheels $h$ or gage wheels whereby the adjustment of the forward end of said lower frame is obtained in gaging the depth of the shovel in the ground.

In raising or lowering the forward end of the lower or pivoted frame to gage the depth of the shovel, an ordinary hand lever $i$, a toothed rack $j$ and a chain $k$ are employed. Said rack is secured to the main frame, the lever pivoted thereto and the chain connected to the lever by its upper end and to the pivoted frame at its lower end as at $l$.

C, indicates the shovel on the rear of which are secured short fingers $m$, and D designates the shaker or separator consisting of a series of bars of peculiar construction and arranged directly in the rear of the shovel. These bars are arranged equal distances apart and are all firmly held in position, providing a grated frame, by a cross bar $n$ consisting of an upper bar $o$ having end lugs $p$ provided with an eye $q$ and a lower bar $r$ which is provided with depressions or grooves $s$ in which the bars forming the grate, are secured. The two bars are riveted or bolted together firmly securing said grate bars between them. If desirable the upper bar may also have the grooves similar to the lower bar, the effect being the same.

E, represents an angular bar, which is pivoted about its center, as at $t$ to the side bar of the lower frame, the lower end of which is pivoted at $u$ to the lug at the end of the bar $o$ and the upper end is pivoted to the forward end of a pitman $v$, which latter in turn is connected at its opposite end, to the cranked end $w$ of a transverse shaft $x$ journaled upon the main frame and said shaft is provided with a sprocket wheel $y$ which is connected to a sprocket wheel $z$, on a transverse shaft $a'$ on the forward portion of the main frame, by a chain $b'$. This latter shaft is given its rotary motion by a chain $c'$ which connects the large sprocket rim $d'$ on the transporting wheels with a small sprocket wheel $x'$, on the end of said transverse shaft. It is preferred to have a sprocket wheel on both ends of the transverse shaft $a'$ and a sprocket rim on each transporting wheel and connected by two chains thus giving double power to the operating parts. These transporting wheels I construct with a peculiarly formed rim, the same being inclined outwardly, that is to say the outer rim or face is of less diameter than the inner edge or face and the periphery thereof is provided with transverse lugs $c''$, the biting edge $e'$ of which is horizontal and the outer edge $f'$ is vertical.

$E'$, represents an inclined rod, the lower forward end of which is rigidly secured to the end of the crossbar $n$, while the opposite end $g'$ is pivoted to the lower end of a short bar or rod $h'$, which latter as well as the inclined bar $E'$, is provided with a series of perforations as shown whereby the same may be adjusted. This short bar $h'$ in turn is pivoted to the side bar of the upper frame in one of the perforations $i'$. Perforations $j'$ are also made in the rear portion of the pitman in order to permit this short bar to be pivoted thereto if desirable. There is a similar construction as just described, on the opposite side of the machine.

The grate bars above mentioned are constructed in such a manner that the grate will act independent of the shovel and readily separate the potatoes from the earth, and as all of said bars are of the same construction I will describe one only. The forward end of the bar is arched and in rear thereof the portions $k'$ are inclined and provided with offsets $l'$ presenting shoulders, while the extreme end $m'$ curves rearwardly and downwardly permitting the potatoes to roll off the grate freely.

The operation of my device is simple. The machine is moved forward after the forward end of the lower frame has been adjusted or lowered to permit the desired depth of the shovel when the latter will pass beneath the potatoes and the latter with earth will pass rearwardly and upon the grate. At the same time the transporting wheels communicate motion to the front transverse shaft by means of the connecting chains, said shaft with its sprocket wheel imparts motion to the rear transverse cranked shaft through the medium of the chain $b'$ that connects with the sprocket wheel $y$, on said shaft. This shaft $x$, by its bent or cranked ends imparts motion to the pitman, which in turn operates the angular pivoted bar E which latter causes the grate to move in such a peculiar manner that the potatoes as well as the earth are received from the shovel and caused to move backward and upwardly and upon the grate. At the same time the offsets or bends in the grate bars come into play by forcing said potatoes rearwardly and off of said grate upon the ground. The movement of this pivoted angular bar in connection with the inclined bar $E'$ rigid to the grate and having a double pivotal connection to the lower frame of the machine, gives the grate a forward, backward and upward movement. At the same time the rigid connection of said inclined bar with said grate serves to support the rear end of said grate. Should it be desirable to give the grate a more forcible shaking or up and down movement the upper end of the short arm $h'$, can be detached from the frame and connected to one of the perforations in the pitman aforesaid.

It will be seen that the pitman, short arm, rear end of the lower frame and the rear end of the rigid inclined bars, each has a series of perforations and thereby the rigid bars can be adjusted to a nicety and in order to give the grate the desired movement. Thus if the short arm is pivoted to the center perforation in the frame it imparts almost a horizontal movement to the grate, and if set to the first perforation it throws the rear end of said grate up and if set in the last hole the rear end of the grate is forced down, and when connected to the pitman as above stated the grate is given a violent up and down motion thus separating the sod and breaking wet earth and it will be further seen that by my construction of the drive or supporting wheels, the lugs do not run deep in the earth unless the wheels should slip when they will run deeper and get a better grip upon the ground and a potato digger as herein described is durable as well as cheap to manufacture.

Having thus described my invention, what I claim, and desire to secure by Letters Patent, is—

1. In a potato digger, the combination with the shovel and grate bars in rear thereof of the bar E, pivoted at its lower end to said grate and at its center to the frame and the pitman $v$, pivoted to the upper end of said bar E, and at its rear end to the transverse cranked shaft $x$, the inclined bar $E'$, pivoted to the short bar $h'$, and rigidly secured at its forward end to the grate substantially as described.

2. In a potato digger, the combination of the shovel, grate, angular bar and pitman the inclined bar and short bar pivoted to the frame or pitman; transverse shaft $x$, having cranks at each end and sprocket wheel thereon engaging a sprocket wheel $z$, and connected by a chain $b'$; the transporting wheels carrying the sprocket wheels and the chain connecting the latter to a sprocket wheel $x'$, on the shaft $a'$, all substantially as described.

In testimony whereof I affix my signature in presence of two witnesses.

FRANCIS J. WOOD.

Witnesses:
R. C. ECKER,
A. J. ECKER.